United States Patent [19]
McKenna

[11] Patent Number: 5,964,221
[45] Date of Patent: Oct. 12, 1999

[54] REBREATHER ADSORBENT SYSTEM

[75] Inventor: Douglas B. McKenna, Dover, Del.

[73] Assignee: Gore Enterprise Holdings, Inc., Newark, Del.

[21] Appl. No.: 08/735,847

[22] Filed: Oct. 23, 1996

Related U.S. Application Data

[63] Continuation-in-part of application No. 08/340,106, Nov. 15, 1994, abandoned.

[51] Int. Cl.$^6$ .................................................. A62B 7/10
[52] U.S. Cl. ............................. 128/205.12; 128/201.27; 128/205.28
[58] Field of Search ................ 128/204.13, 205.2, 128/205.27, 205.28, 205.29, 206.16, 206.17, 206.19, 202.26, 205.12, 201.27, 201.28; 55/486, 487

[56] References Cited

U.S. PATENT DOCUMENTS

| | | | |
|---|---|---|---|
| 3,577,988 | 5/1971 | Jones | 128/142.7 |
| 3,604,416 | 9/1971 | Petrahai | 128/142.3 |
| 3,659,400 | 5/1972 | Kester | 55/33 |
| 3,910,780 | 10/1975 | Henley et al. | 55/158 |
| 4,168,706 | 9/1979 | Lovell | 128/142 R |
| 4,196,070 | 4/1980 | Chao et al. | 204/266 |
| 4,212,846 | 7/1980 | Wise | 422/122 |
| 4,217,386 | 8/1980 | Arons et al. | 428/198 |
| 4,234,326 | 11/1980 | Bailey et al. | 55/278 |
| 4,350,662 | 9/1982 | Dowgul et al. | 422/122 |
| 4,409,978 | 10/1983 | Bartos | 128/205.12 |
| 4,614,186 | 9/1986 | John | 128/201.25 |
| 4,692,369 | 9/1987 | Nomi | 428/198 |
| 4,963,327 | 10/1990 | Russell | 128/202.26 |
| 4,985,296 | 1/1991 | Mortimer | 428/220 |
| 5,114,582 | 5/1992 | Sandstrom et al. | 210/321.74 |
| 5,133,864 | 7/1992 | Vaughn et al. | 210/437 |
| 5,165,394 | 11/1992 | Hochberg | 128/201.25 |
| 5,165,399 | 11/1992 | Hochberg | 128/205.12 |
| 5,240,479 | 8/1993 | Bachinski | 128/206.17 |
| 5,298,046 | 3/1994 | Peisert | 55/486 |
| 5,320,096 | 6/1994 | Hans | 128/205.29 |
| 5,395,411 | 3/1995 | Kobayashi | 55/486 |

FOREIGN PATENT DOCUMENTS

| | | | |
|---|---|---|---|
| 284 412 | 11/1990 | German Dem. Rep. | 128/205.29 |
| 2207017 | 8/1972 | Germany . | |
| 4039952 A1 | 6/1992 | Germany . | |
| 1429476 | 3/1976 | United Kingdom . | |
| 94/02192 | 2/1994 | WIPO . | |
| 96/15027 | 5/1996 | WIPO . | |

OTHER PUBLICATIONS

"Equipment for the Working Diver", 1970 Symposium, Feb. 25, 1970.

*Primary Examiner*—Aaron J. Lewis
*Attorney, Agent, or Firm*—David J. Johns

[57] ABSTRACT

A gas absorption rebreather canister containing at least one sheet embodying adsorbent material inside and a portion of the sheet spaced apart by a separating means. The sheet being arranged so that expelled gases entering the canister pass along the canister interior substantially parallel with a surface of the sheet. The sheets can be formed with an internal screen positioned between two gas-permeable, liquid-water resistant membranes and the adsorbent material positioned within interstices between the screen members. Also, the sheets can comprise a sheet of expanded porous PTFE having a microstructure of nodes interconnected with fibrils, said sheet containing gas adsorbent material. The sheet can be covered on each side by a sheet of expanded porous PTFE. This device effectively contains the adsorption material within the sheets even when exposed to liquid water. The result is a rebreather device that is safer, more efficient, and easier to use than any presently on the market.

51 Claims, 10 Drawing Sheets

REBREATHER ADSORBENT SYSTEM

RELATED APPLICATIONS

The present application is a continuation-in-part of United States patent application Ser. No. 08/340,106, filed Nov. 15, 1994 now abandoned.

FIELD OF THE INVENTION

The present invention relates to an adsorbent system for removing carbon dioxide from expelled air in rebreathing equipment used for self-contained underwater diving and the like.

BACKGROUND OF THE INVENTION

In its simplest form a rebreather is a device that enables a person to retain and reuse some or all of his or her expired breath. Even with physical exertion, a person uses only a fraction of the oxygen that is inhaled. A rebreather recirculates unused oxygen in the system and replenishes the oxygen as it is used by the wearer. This allows a very small tank of oxygen to last much longer than is possible using traditional SCUBA (Self Contained Underwater Breathing Apparatus) gear. The three main components of typical rebreather systems are gas supply/oxygen control, counterlung, and carbon dioxide removal system.

A rebreather has a carbon dioxide removal system that maintains $CO_2$ pressures at a safe level. This is relatively easy to do, and is accomplished by passing exhaled gases through a canister filled with a chemical adsorbent, such as soda lime. Several manufacturers make these adsorbents and use their own special mixes. For example, SODASORB®, manufactured by W. R. Grace & Co., consists of a mixture of sodium hydroxide, calcium hydroxide and potassium hydroxide. Other adsorbents, such as lithium hydroxide, can be used to offer improved cold water performance.

Adsorbents are typically in the form of small granules 0.04 to 0.25 inches (1.0 to 6.5 mm) in diameter, placed in a canister through which exhaled gases are passed. Smaller granules allow more surface area per unit weight, but because the person must "breathe" through this canister without too much resistance, larger adsorbent particles are employed so as to allow gas flow around these granules, and through the canister with a relatively low pressure drop. Thus, one of the limitations of current adsorbent canisters is the relatively large adsorbent particle size necessary to get low pressure drops and in turn, ease of breathing.

The current method for filling $CO_2$ canisters is by pouring the granules into the canister, and then tapping on the canister to get the granules to settle, leaving enough room for a foam liner, which is commonly later compressed, to prevent granule migration. If too much tapping or compression is administered, the granules will particulate or "dust" as they grind together. If not enough settling of the granules has occurred, the granules may shift during diving and cause "channeling" of expired gases through areas of the canister bed that have fewer granules. Thus, depending upon the granule loading technique from person to person, different operational efficiencies can be achieved, with reduced efficiencies occurring due to "channeling" or dusting. Additionally, as is explained below, highly dangerous conditions can occur if loading is not properly performed. Even without these problems, granular adsorbents have to be loaded on-site and are difficult and time consuming to pour into the canister, especially when on the deck of a boat in rough water.

One of the early problems encountered with adsorbent canisters was that breathing in small particles of these adsorbents damaged the user's lungs and throat. Thus, today's adsorbent granules may have non-adsorbing components designed to minimize friability and particulation. This problem can be solved through the use of hydrophobic inlet and outlet filters on the canisters that filter out any airborne particles. The drawback of using these filters however is the increased breathing resistance. By increasing the filter's surface area, the pressure drop can be minimized, but only at the expense of a larger, space consuming filter, such as a pleated filter element. Thus another limitation of existing canisters is the tradeoff between safety, breathing resistance, and size.

Another more serious problem with rebreather systems is that of flooding the rebreather with water by removal of the mouthpiece, or by failure of other systems. If this occurs, water can get into the adsorbent canister, pickup adsorbent particles, and flow into the user's mouth. In fact, it is not even necessary for a system failure to occur to precipitate this dangerous event. Plenty of water from condensation is present in the canister in normal use. This water can mix with adsorbents, and the mixture can work its way around the breathing loop, and into the user's mouth. This occurrence is referred to as "caustic cocktail" in the industry and is especially dangerous when using lithium based adsorbent materials. The use of check valves and water traps can minimize the risk of caustic cocktail. However, these improved systems, while being safer, have the disadvantage of being harder to breathe through and being bulkier. Hydrophobic inlet and outlet filters could also prevent this caustic from exiting the adsorbent canister, but again at the expense of a higher breathing resistance or a bulkier system. Additionally, a hydrophobic inlet filter that prevents water from entering the canister also has the problem of accumulating water, which prevents air from flowing into the canister. Thus an operational problem with this solution to the caustic cocktail, is that just when you are relying on the filter to prevent water from entering the canister, you also prevent air from entering the canister, and the system is rendered useless, and the dive must be aborted.

U.S. Pat. No. 5,165,399 to Hochberg, discloses a $CO_2$ absorption means in which an adsorbent is intimately admixed with fibrous material and formed into a sheet. The sheet is bonded to a $CO_2$ permeable fabric layer to improve the overall strength. The technique disclosed allows $CO_2$ absorption sheets to be produced that are less likely to particulate compared to granular adsorbent systems. The deficiency of this technique is that additional support materials, such as wovens or non-wovens, must be used for structural integrity. Another more important deficiency with this technique is that it does not produce an adsorbent that is designed to be exposed directly to liquid water.

It is accordingly a purpose of the present invention to provide a rebreathing $CO_2$ adsorbent system that offers little or no risk of inhalation of adsorbent.

It is also a purpose of the present invention to provide a canister that can be flooded without exposing the adsorbents to water, while still allowing the flow of breathing gases.

It is yet another purpose of the present invention to provide a $CO_2$ adsorbent system that offers all of the aforementioned advantages without a penalty of increased pressure drop.

It is also a purpose of the present invention to provide a rebreather adsorbent system that is easier to load, and less messy than current granular systems.

It is also a purpose of the present invention to maximize the duration that the canister adsorbs carbon dioxide.

These and other purposes of the present invention will become evident from review of the following specification.

SUMMARY OF THE INVENTION

The present invention is a gas adsorbent rebreather system that is extremely water tolerant while being designed to provide efficient adsorption of $CO_2$ with minimal pressure drop for gases passing through the system. The present invention employs a gas permeable, hydrophobic (liquid-water repellent), water-vapor permeable sheet having an adsorbent material inside which provides excellent adsorption capability along with containment of the adsorbent material within the canister. The water repellent nature of the sheet prevents water, in the event the canister becomes flooded with water, from reaching and contacting the adsorbent material inside the sheet.

In one embodiment, the gas adsorption canister has an inlet, a body, and an outlet, in which the canister body contains at least one sheet and preferably a plurality of sheets containing adsorbent material. The sheet is positioned inside the canister, and is arranged such that gas entering the inlet passes substantially parallel with one surface of the sheet. The sheet is porous so that $CO_2$ can diffuse into the sheet and contact the adsorbent material. But the pores are small enough that liquid-water cannot penetrate into the sheet and contact the adsorbent material.

Preferably, the canister contains a number of such parallel sheets. At least a portion of the multiple number of sheets is spaced apart by a separating means to enhance gas flow along the adsorbent sheet. In one embodiment, the separating means can be a separating screen positioned between the sheets. In a preferred embodiment, the separation means comprises molding the adsorbent itself directly into separating ribs on one or both sides of the adsorbent sheet surface. The separation means can also be a potting material attaching the sheet to the canister wall.

The sheets containing the adsorbent material can be formed in several ways. First, the sheets can be formed of an internal screen positioned between two hydrophobic, liquid-water repellent, gas-permeable membranes or films with the adsorbent material positioned within voids between the screen members. In another embodiment an internal screen is surrounded by adsorbent material and two hydrophobic, liquid-water repellent, gas-permeable membranes or films are placed over the adsorbent material. In a third embodiment, the sheets are formed of a porous hydrophobic, liquid-water repellent membrane, such as expanded porous polytetrafluoroethylene (PTFE) having a microstructure of nodes interconnected with fibrils in which the sheet contains a gas adsorbing material. In a fourth embodiment, the sheet is formed of a porous liquid-waterproof membrane filled with a gas adsorbing material that is covered on each side by another porous membrane. In a fifth and preferred embodiment, the adsorbent is created by mixing adsorbent powder with oil and a polymer at an elevated temperature, and then creating a microporous structure by way of thermally induced phase separation of the polymer. The process oil is then extracted, leaving the adsorbent powder held together by the polymer. Hydrophobic membranes such as expanded porous PTFE are adhered to the surface of this adsorbent. These configurations all effectively contain the adsorption material within the canister when exposed to both gas and water and allow efficient adsorption at a low pressure drop.

In one of its simplest forms the $CO_2$ removal system of the present invention comprises a canister that contains many individual layers in which the chosen chemical adsorbent has been encapsulated in a waterproof, gas-permeable membrane that has a high degree of particulate filtration efficiency. Exhaled air flows into the cartridge and past (as opposed to through) these membranes.

This construction provides many distinct advantages over previous $CO_2$ removal canister constructions. First, by encapsulating the chemical adsorbent in a membrane that has a high degree of particulate efficiency, there is little or no chance of any particles being breathed in by the user. Second, because the membrane is gas permeable, exhaled $CO_2$ can easily pass through and be adsorbed by the chosen chemical adsorbent. Third, because exhaled gases flow past these membranes and not through them, the pressure drop through the canister is very low, thereby providing the user with a system that is easy to breathe through. Fourth, because the cartridge is loaded into the canister as one piece, the process of refilling the canister is much easier, safer, and more convenient. Fifth, because water is able to flow past the adsorbent, water in the canister does not block the flow of breathing gases. Finally and most importantly, because the membrane is hydrophobic, liquid water is not able to penetrate the membrane and mix with the chemical adsorbent, thereby preventing the "caustic cocktail" potential.

BRIEF DESCRIPTION OF THE DRAWINGS

FIG. 1b is a side view of the embodiment of FIG. 1a.

DETAILED DESCRIPTION OF THE INVENTION

The present invention provides a gas adsorbent rebreather canister that is designed to provide efficient adsorption, uniform depletion of adsorbent material, containment of the adsorbent material even when exposed directly to liquid water, and a minimum pressure drop for gases passing through, even if water is present, particularly in scuba diving equipment. Additionally, the present invention accomplishes all of these features while being easier and simpler to load and unload than previous rebreather devices.

Figure 1A:
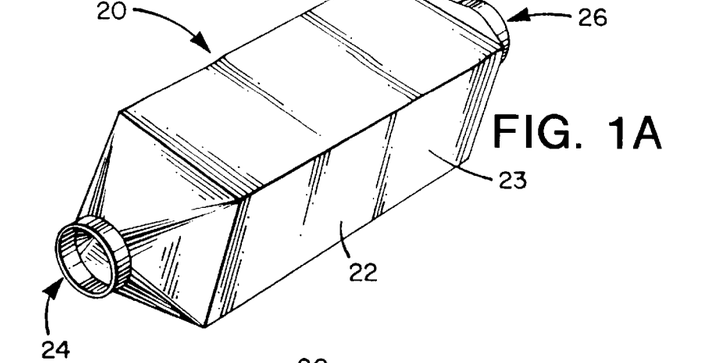
FIG. 1a is a perspective view of square shaped gas adsorption canister of the present invention.
Figure 1B:
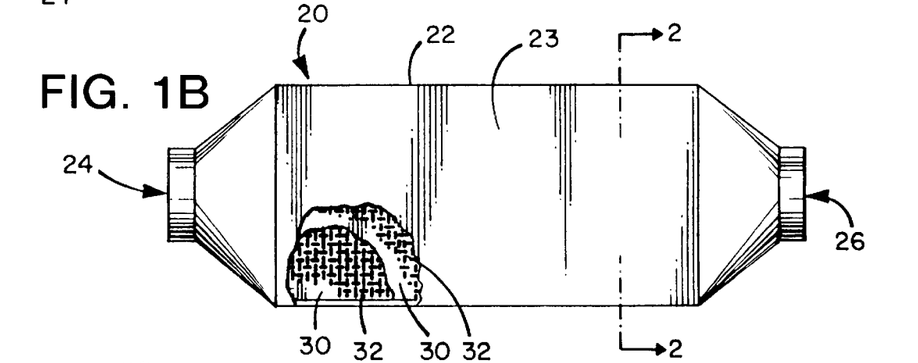
Figures 2, 3:
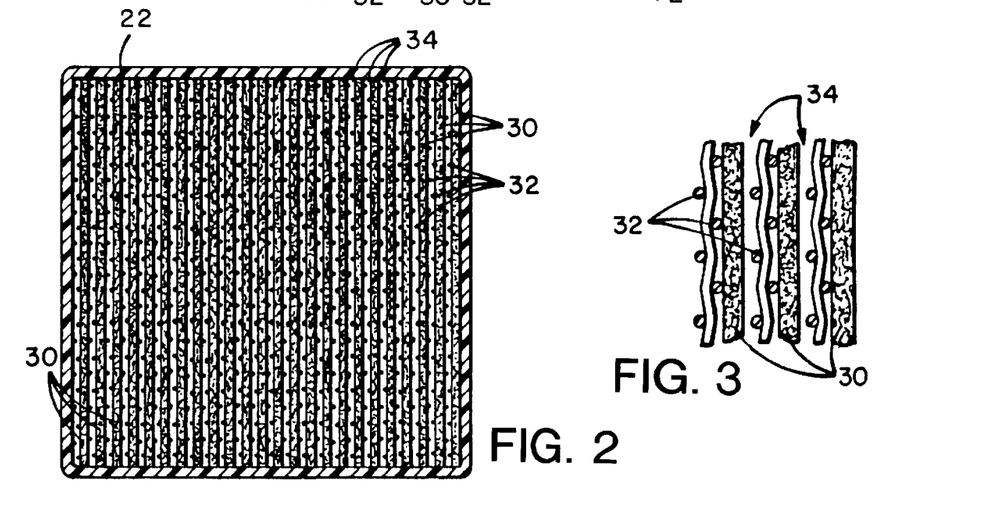
FIG. 2 is a cross-section view of parallel aligned sheets taken along line 2—2 of FIG. 1b.
FIG. 3 is an enlargement of a portion of the cross-section shown in FIG. 2.

As the mechanism for removing $CO_2$ from a gas is dependent on the particular material chosen, the use of the word "adsorption" in this specification is meant to include adsorption, absorption, chemisorption, etc. In FIGS. 1a and 1b, an improved gas adsorbent canister device, indicated generally at 20, comprises wall 22 defining a hollow canister body 23 that has a gas inlet 24 and outlet 26. The canister 22 can be of any shape, but preferably is rectangular or cylindrical. The canister can be composed of a rigid material, such as glass fiber reinforced plastic. As is illustrated in FIGS. 2 and 3, the inside hollow portion of the canister contains porous, liquid-water resistant, air permeable sheets 30 that contain an adsorbent material. These sheets 30 are aligned parallel to the direction of gas flow and run substantially the length of the canister body. Expired gases pass through the inlet 24 of the gas absorption canister 20, through the space 34 between the sheets 30, and out through the outlet 26. As expired gases flow past these adsorbent sheets, certain gases will diffuse into said sheets and react with or be adsorbed by adsorbents contained therein. Since the sheet surfaces are aligned parallel to the gas flow, a controlled and lower pressure drop is maintained, as well as uniform flow past all sheets, allowing for efficient adsorption and a uniform depletion of the adsorbent contained in the sheets 30.

As shown in FIG. 2, the canister 22 contains a plurality of porous hydrophobic, gas-permeable adsorbent sheets 30 that are aligned so that the gas flows substantially parallel to the sheet 30 surfaces. In this embodiment, the canister body 22 has a rectangular cross-section. The sheets 30 are spaced apart from each other by separating screens 32. FIG. 3 shows a detailed view of circular section 90 and depicts the adsorbent sheets 30 and separating screens 32 where the separating screens 32 are positioned between the sheets 30.

The separating screen 32 and sheets 30 are held in position parallel to the gas flow through the canister. The separating screen 32 and sheets 30 may be directly attached to the canister wall 22 or may be indirectly attached by use of a frame or other device that is attached to the canister wall, or may be held in place by the internal shape of the canister.

Figure 4:
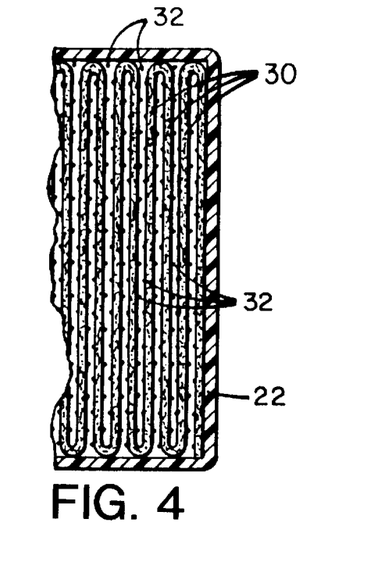
FIG. 4 is a cross-section view of a canister of the present invention having a pleated sheet.

FIG. 4 shows another embodiment taken along line 2—2 of FIG. 1b where a rectangular canister body 22 contains a sheet 30 that is "pleated" and portions of the pleated sheet are spaced apart by separating screens 32. The separating screens 32 need not be attached to the canister body 22 or to the sheet 30.

Figure 5:
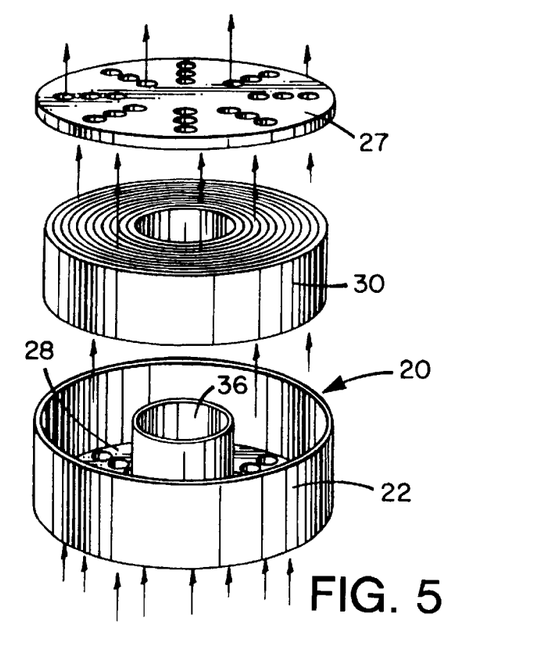
FIG. 5 is a three-quarter perspective view of an adsorption canister of the present invention where the canister is cylindrical and the sheets are spiral.
Figure 6:
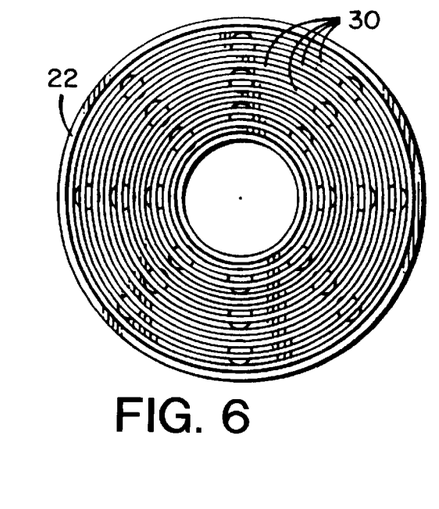
FIG. 6 is a cross-section top view of the adsorption canister of FIG. 5 where the sheets inside the canister have a spiral configuration.
Figure 7:
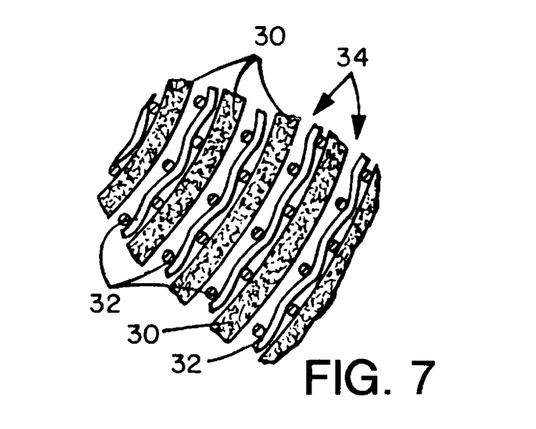
FIG. 7 is an enlargement of the circular area of the cross-section shown in FIG. 6 showing the sheets separated by a separating means.

As illustrated in FIG. 5, in another embodiment of the present invention, the canister 20 can have a circular or cylindrical shape. The canister can have an opening 36 in the middle giving the canister a donut shape or the canister can be solid. In the embodiment depicted, the sheets 30 are spiraled (i.e., arranged in a continuous helix or as separate rings or helixes arranged concentricity). Air flow through the cylindrical canister body 22 is from bottom to top as indicated on FIG. 5 and is parallel to the spiraled adsorbent sheet surfaces. Flow is through end plates 27 and 28. FIG. 6 shows a top view of cylindrical canister 20 of FIG. 5 with adsorbent sheet 30 arranged within the canister 22 in the "spiral" configuration where the sheet is wrapped around the center. FIG. 7 shows separating screens 32 positioned between the spirally positioned sheets 30.

The flow rate of expired gas through the canister is controlled by the total space between the adsorbent sheets. Accordingly, a canister with a larger cross-sectional area, or a thicker separating means, would have the effect of reducing the velocity of gas flow past the adsorbent sheets. This velocity must be matched with the length of the canister to achieve the desired adsorption rate for a particular application and adsorbent material.

The present invention also provides a gas adsorbent sheet 30 that provides isolation of the adsorbent from the user in wet and dry environments. The sheets 30 are constructed to contain adsorbent particles within and to withstand exposure to vibration, air, and water without releasing the adsorbent particles. Various embodiments of sheets 30 of the present invention are shown in FIGS. 8, 9, 10, 11, 17, 18, and 22 and are described below.

Figure 8:
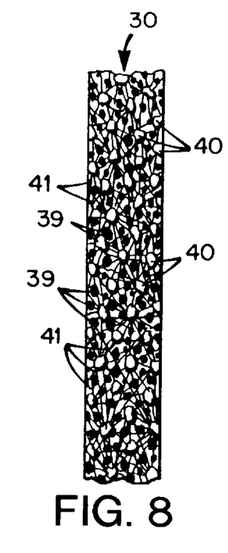
FIG. 8 is a cross-section view of an adsorption sheet of the present invention where the sheet is formed of expanded polytetrafluoroethylene with adsorbent particles encapsulated within.

In one embodiment shown in FIG. 8, sheet 30 is formed of an adsorbent filled expanded porous PTFE sheet having a microstructure of nodes 40 interconnected with fibrils 41 wherein adsorbent material 39 is present in the voids of the PTFE structure as taught by U.S. Pat. No. 4,985,296 issued to Mortimer, Jr., incorporated by reference. This sheet is water repellent, but air-permeable. Ideally, particles 39 are packed in a multi-modal (e.g., bi-modal or tri-modal) manner, with particles of different sizes interspersed around one another to fill as much of the available void space between particles as is possible so as to maximize the amount of active material contained in the sheet. This technique also allows more than one type of adsorbent particle to be filled into a single sheet.

By using filled porous expanded polytetrafluoroethylene (ePTFE) as sheet 30, a number of additional advantages are further imparted. Expanded PTFE is a non-linting, non-outgassing inert material that effectively reduces dusting of adsorbent material during manufacturing and during the life of the filter. Additionally, processing advantages of this material include the ability to make a relatively thin material that can be produced in a wide sheet and then cut (or cut and pleated) into desired configurations.

The properties of $CO_2$ adsorbent filled ePTFE sheet are such that no other supporting fabric or material is needed to maintain structural integrity. In fact, not only can this filled ePTFE sheet withstand flexing, pleating and mechanical vibration under dry conditions, the hydrophobicity of the ePTFE offers this structural durability even while subjected to direct liquid water contact, without water ever mixing with the $CO_2$ adsorbent. Thus, this embodiment of sheet 30 is ideal for preventing the "caustic cocktail" problem.

Figure 9:
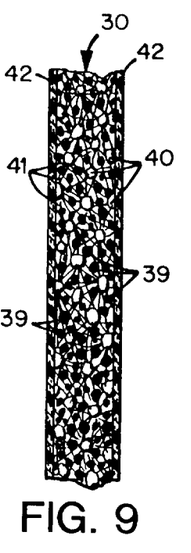
FIG. 9 is a cross-section view of an adsorption sheet of the present invention where the sheet of FIG. 8 is surrounded by an outer membrane.

Another embodiment of the sheet 30 is shown in FIG. 9, where the filled ePTFE sheet 30 is encapsulated between two hydrophobic gas-permeable membranes 42. These outer membranes 42 add extra protection to ensure that the adsorption material 40 is contained within the sheet 30 while preventing water from reaching the adsorbent contained in the sheet. The membranes 42 must have a high degree of filtration efficiency to prevent adsorbent particles from escaping into the breathing gas circuit. These membranes 42 preferably comprise porous expanded polytetrafluoroethylene (ePTFE), because it is hydrophobic and offers a high particulate filtration efficiency. Additionally, PTFE provides a number of improved processing advantages, such as being able to be formed in extremely thin dimensions while remaining coherent and pin-hole free, and being able to be made into wide widths that can be slit to the desired width. The thinner the membrane the greater the filter adsorption rate in a given volume. As such, these outer membranes may be very thin and need not be used to add any structural integrity but merely to provide filtration and hydrophobicity only. The outer membranes 42 can be attached to the sheet 30 by a thermoplastic adhesive polymer. With the additional protection of these outer layers of ePTFE, the use of more effective but potentially more hazardous $CO_2$ adsorbents is contemplated.

Figure 10:
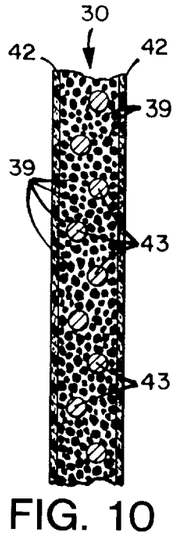
FIG. 10 is a cross-section view of an adsorption sheet of the present invention where adsorbent material is attached to an internal screen and outer membranes are attached to the adsorbent particles.

A third embodiment of the sheet is shown in cut-away FIG. 10 where an internal screen 44 is encapsulated by adsorbent material 39 that is surrounded by two hydrophobic gas-permeable membranes 42.

Figure 11:
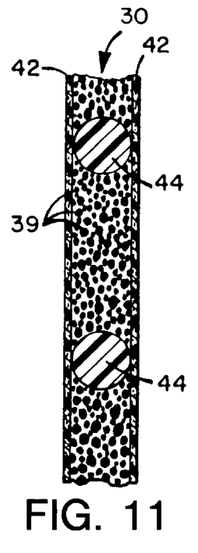
FIG. 11 is a cross-section view of an adsorption sheet of the present invention where outer membranes are attached to an internal screen and the interstices in the screen contain adsorbent material.

A fourth embodiment of the sheet 30 is shown in FIG. 11 where an internal screen 44 is attached to two hydrophobic gas-permeable membranes 42 and the adsorbent material 39 is positioned in the voids between the screen members 44.

Figure 12:
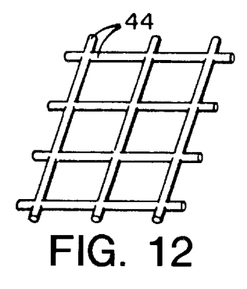
FIGS. 12 through 15 are three-quarter elevation views of a method for forming the sheet of FIG. 11.
Figure 13:
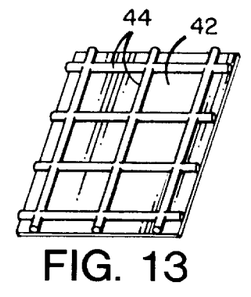
Figure 14:
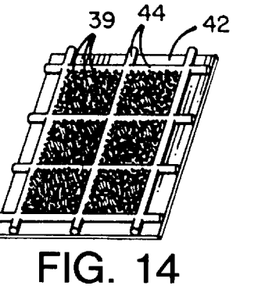
Figure 15:
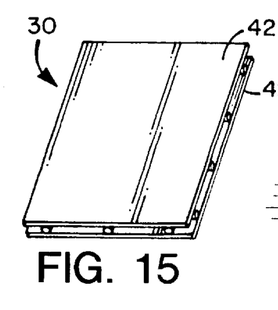

FIGS. 12 thorough 15 illustrate a method for making the sheet 30 of FIG. 11 having an internal screen 44, adsorbent material 40, and outer membranes 42. FIG. 12 depicts the internal screen 44. Next, in FIG. 13, internal screen 44 is attached to a membrane 42 by a lamination process. Subsequently, in FIG. 14, adsorbent material 39 is added into the open cells of internal screen 44. Afterwards, in FIG. 15, a second membrane 42 is laminated to the top of the internal screen 44, thereby encapsulating the adsorbent material 40 within.

The particular adsorbent material or particle 39 used in the sheet of the invention depends on the particular gas being adsorbed. To adsorb $CO_2$ gas, adsorbent material 39 may comprise calcium hydroxide, sodium hydroxide, potassium hydroxide, lithium hydroxide (LiOH) and mixtures thereof or other Group IA and IIA metal hydroxides as well as polymer adsorption materials. By "particle" is meant individual particles of any aspect ratio and thus includes fibers and powders.

Figure 16:
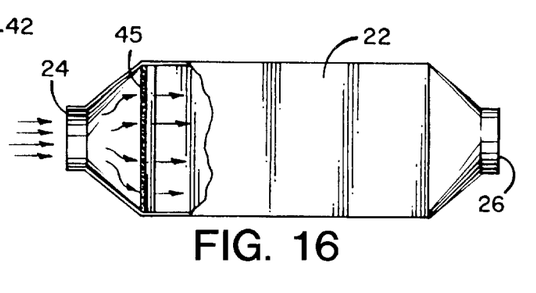
FIG. 16 is a cut-away view of the canister of FIG. 1 and depicts a diffusion panel that redistributes gas flow equally across the canister cross section.

In another embodiment of the present invention, shown in FIG. 16, a gas diffusion panel 45 is placed upstream of adsorbent sheets 30. The diffusion panel 45 acts to redistribute the gases flowing through the canister 20 such that gases flow evenly between all adsorbent sheets 30. This redistribution of gas occurs because of the pressure drop across the diffusion panel 45. The diffusion panel comprises a flat sheet that can be made out of any porous material such as sintered plastics or metals, woven and non-woven synthetic or natural fabrics, etc. The gas diffusion panel 45 is preferably not hydrophobic to the extent that if water enters the canister 20, it will be able to flow through the diffusion panel without building up any significant pressure. Through the use of this diffusion panel, the amount of gas flowing past each individual sheet 30 is largely determined by the uniformity of the diffusion panel 45. This, in addition to the precise sheet 30 spacing via separating screens 32 with uniform thickness, allows for excellent uniformity in flow, and in turn, adsorbent reaction, and utilization of the canisters 20 internal dimensions.

Figure 17:
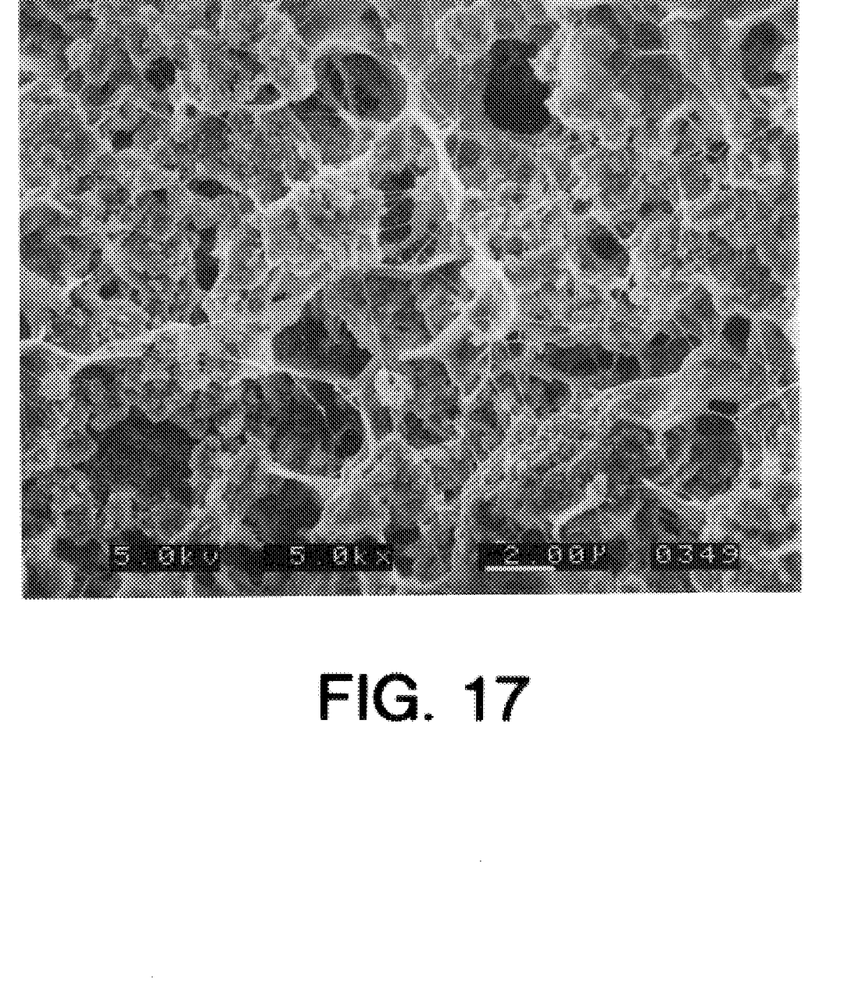
FIG. 17 is a scanning electron micrograph (SEM), enlarged 5,000 times, of a cross section of an adsorbent sheet of the present invention were the adsorbent powder is formed into a microporous sheet by thermally induced phase separation of polyethylene.
Figure 18A:
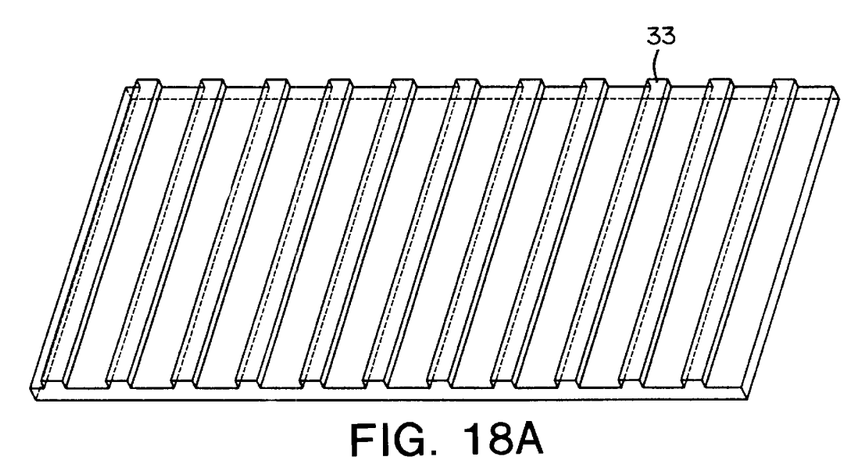
FIG. 18A is a three-quarter top elevation view of an adsorbent sheet for use in the present invention, in which separating ribs have been molded on one side of the sheet out of the adsorbent itself.
Figure 18B:
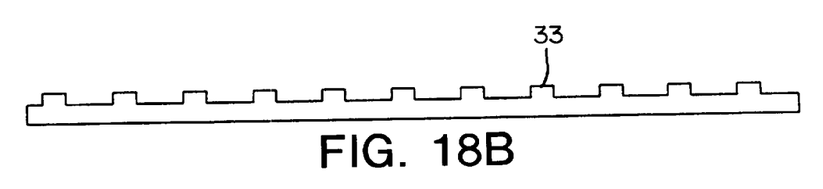
FIG. 18B is a cross-section view of the adsorbent sheet shown in FIG. 18A.
Figure 18C:
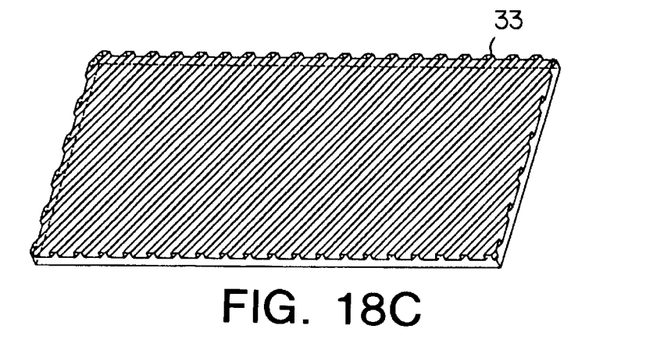
FIG. 18C is a three-quarter top elevation view of another embodiment of an adsorbent sheet for use in the present invention, in which separating ribs have been molded in an angular fashion on one side of the adsorbent sheet.
Figures 18D, 18E:
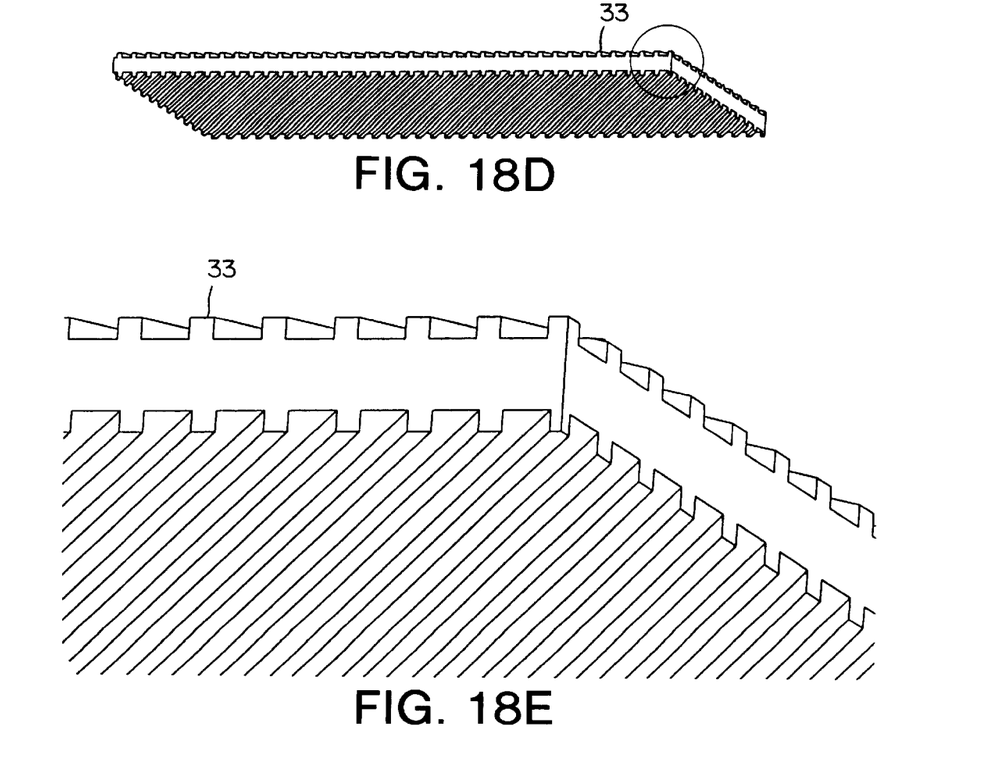
FIG. 18D is a three-quarter side elevation view of still another embodiment of an adsorbent sheet for use in the present invention, in which separating ribs have been molded in an angular fashion on both sides of the adsorbent sheet.
FIG. 18E is a detailed view of the adsorbent sheet illustrated in FIG. 18D.

FIG. 17 is a scanning electron micrograph of another embodiment of sheet 30 of the present invention. This structure is produced by way of thermally induced phase separation, such as in the following manner.

A water repellent polymer, such as ultra high molecular weight polyethylene, is combined with a gas adsorbent material, such as calcium hydroxide powder. This combination may be accomplished by combining the two materials together in an extruder. By conveying this mixture through the extruder and mixing with a lubricant, such as mineral oil, the polymer dissolves in the lubricant and become uniformly mixed with the adsorbent and lubricant. This mixture can then be extruded into a composite sheet or other shape.

The composite sheet may be calendered to further flatten the sheet if desired. The lubricant may then be extracted out of the resulting sheet using a solvent, such as hexane. The solvent may then be removed, such as through use of a dry nitrogen purge.

The composite sheet may then be rolled over a separating screen to form a spirally wrapped roll of gas adsorbent material. A shrink wrap, such as a tube or sheet of heat contracting polymer material, may be placed over the roll, and heated to shrink down onto the adsorbent roll. This roll of adsorbent material may then serve as a cartridge to be inserted into a rebreather canister.

The resulting structure is highly microporous, allowing for the diffusion of $CO_2$ or other gases, and yet is able to be produced with very high adsorbent powder loadings per unit volume. Additionally, if a very strong polymer, such as Ultra High Molecular Weight Polyethylene is used, a very small amount of polymer is required to make the sheet structurally stable, which allows for even higher adsorbent loadings per unit volume. While typical powder loadings for this type of manufacturing process are on the order of 50 to 60% filler powder after process oil extraction, it has been found for this application that loadings well above 60% are possible. In fact, adsorbent loadings of 90% by weight are easily achieved, and it is possible to achieve loadings greater than 97%. Additionally, it is possible to mold this material into any desired shape, and thus, the separating means can be accomplished by molding separating ribs onto the surface of the sheet.

Various embodiments of this molded structure are illustrated in FIGS. 18A through 18E. By molding the separating elements 33 (or "ribs") directly out of adsorbent material, not only is the adsorbent cartridge easier to produce, but, because of its self-separating properties, the total amount of adsorbent in the filter can be increased by 10 to 30 percent.

Molding the separating elements 33 also assists in controlling the height to width ratio of the rib itself. Because the amount of adsorbent material contained in the molded separating ribs adds significantly to the total capacity of the adsorbent system, it is desirable to also optimize the rate at which adsorbent is depleted in the rib. If the environmental conditions in which the canister operates is thermally constrained, it would be desirable to have a smaller surface area to volume ratio, and as such, a width to height ratio of the rib of greater than two to one (2:1) would be desirable. If the environmental conditions of operation cause the adsorbent system to be diffusion constrained, the rib width can be made at about the same thickness of the adsorbent sheet itself. It is also possible depending on test conditions, to use the adsorbent contained in the rib area to change the shape of the $CO_2$ outlet concentration vs time curve.

Another feature that is achievable with this process is control over hydrophobicity. Most of the caustic potential that standard granular adsorbents present is due to powdering of the adsorbent. A smaller but significant problem is water soluble components of the adsorbent, like sodium hydroxide. To prevent this material from dissolving, the adsorbent material must be hydrophobic, in addition to retaining particulates. It has been discovered through experimentation, that polymer contents between 0.6 and 1.5% by weight before process oil extraction achieves the goal of eliminating powdering, and even has a slight "skin," on the surface, which has a slightly higher polymer content. This "skin" does an excellent job of preventing any adsorbent from powdering or flaking away. At these polymer levels, however, the surface of the sheet is not hydrophobic.

To make the surface hydrophobic, the polymer content must be raised above 1.5%. Above 4%, even though the surface is quite hydrophobic, this skinning effect begins to inhibit the diffusion of $CO_2$ into the porous structure. As such, for the purpose of making the adsorbent both hydrophobic, and gas permeable, a polymer content between 1.5% and 4% is believed ideal.

All of the embodiments of adsorbent sheet 30 that have a hydrophobic surface are believed to be challenged in their ability to absorb $CO_2$. Standard $CO_2$ adsorbents that are used for rebreathing applications must have water present in the adsorbent. The reaction of $CO_2$ and water to create carbonic acid occurs at a rate much faster than the reaction of $CO_2$ directly with the adsorbents themselves. Additionally, the reaction rate of carbonic acid and the adsorbents also occurs at a faster rate, and thus, anywhere from 13% to 19% water by weight can be found in most commercially available $CO_2$ adsorbents for rebreathing. A potential problem with using a hydrophobic protective member as employed in the present invention is how to get 13% to 19% water into the structure, which has been designed specifically to prevent water from entering. With a hydrophobic surface, when water is added to the adsorbent, the water just beads up on the surface of the sheet, instead of soaking into the adsorbent, as it does with standard granular adsorbents. This problem is solved by employing a mixture of water and alcohol in the preparation of the membrane. The alcohol-water mixture will readily wet the adsorbent and will thus provide the desirable moisture content. This procedure is explained in greater detail in the following example section of this specification.

Figure 22:
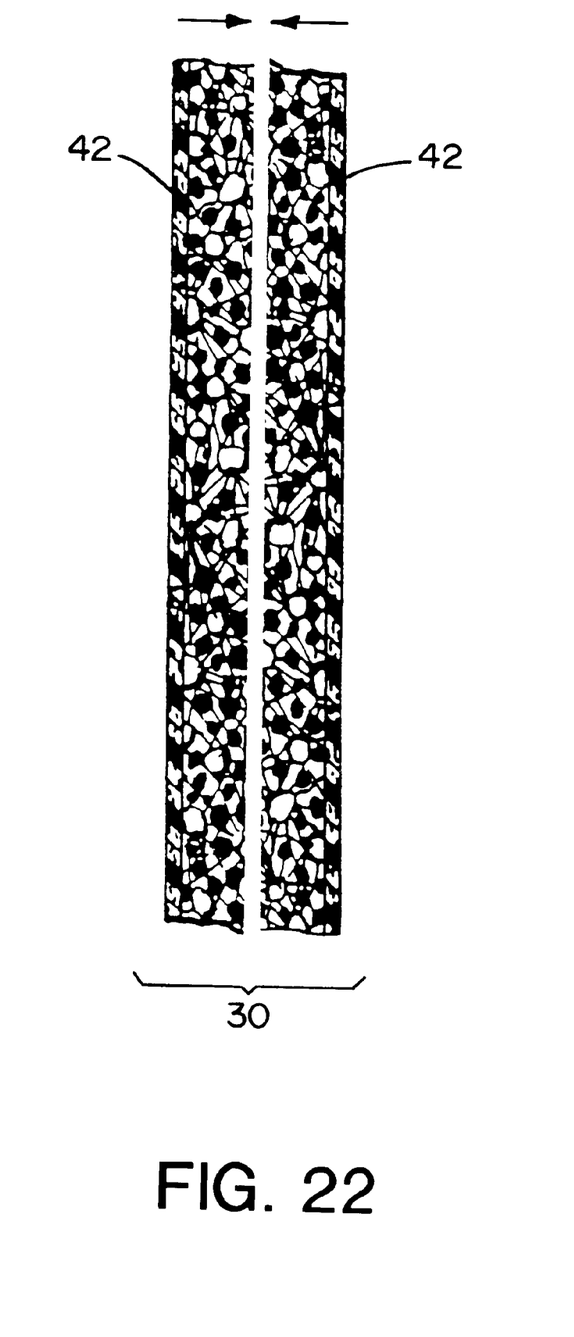
FIG. 22 is cross section view of a two layer adsorbent sheet, of a preferred embodiment of the present invention, and depicts the adsorbent of FIG. 17, with expanded PTFE membrane adhered to one side and combined with the PTFE facing out.

FIG. 22 is a cross section of a preferred embodiment of adsorbent sheet 30 of the present invention. The adsorbent is produced in the same manner as described with respect to the embodiment of FIG. 17, except an expanded PTFE membrane 42 is adhered to one side of the adsorbent. Two layers of this material are combined to form adsorbent sheet 30, with the expanded PTFE membrane 42 facing out. Material produced in this way has the best hydrophobicity characteristics, and yet, because it is produced in two layers, the adsorbent is able to be moisturized by spraying the non PTFE side with water, without the use of additional solvents as previously described. Elimination of solvent in the water both simplifies and reduces the cost of the moisturization process.

The rebreather canister of the present invention provides many distinct advantages over previous adsorbent canister constructions. The present invention provides an adsorbent sheet that provides excellent containment of the adsorbent within the sheet even when exposed to water. The alignment of the adsorbing sheet such that gas flows parallel to the sheet surface, in addition to a gas diffusion panel, provides efficient adsorption while creating a minimum pressure drop through which to pass gases. These advantages of safety, efficiency, and reduced breathing resistance of the present invention are all achieved without any penalty in size or bulk of the canister, and also allow the continued flow of breathing gases even when water is present. The elements of the present invention combine to provide a rebreather filter that is actually easier for the diver to load and unload.

For these reasons the adsorbent system of the present invention is a major advancement in the art of rebreathers for use in Self Contained Underwater Breathing Apparatus. In addition to possible use by military personnel, the rebreather of the present invention is believed to be safe and efficient enough as to allow its use in mainstream sport diving.

Without intending to limit the scope of the present invention, the present invention can be better understood by review of the following examples:

EXAMPLE 1

A rebreather device of the present invention was made from the following components in the following manner.

Components:
1. Empty $CO_2$ MK16 rebreather canister made by Carlton.
2. Polypropylene screen: 0.25 inch (6.35 mm) square cell, 0.06 inch (1.5 mm) thick, manufactured by Intermet Company.
3. GORE-TEX® expanded PTFE membrane: 0.5 mil thick, gas flow rate of 18 cfm at 0.5 inch (12.7 mm) pressure drop, obtained from W. L. Gore & Associates, Inc.
4. Polypropylene separating screen: 0.034 inches (0.86 mm) thick NALETEX obtained from Nahle Plastics. Co.
5. Partially reticulated polyester foam 0.25 inches (6.35 mm) thick.
6. SODASORB fines, manufactured by W. R. Grace & Co. ($CO_2$ adsorbent).

The SODASORB® fines are first sieved to remove any granules larger than mesh size 20. Water is then added to the fines to reach a 15% by wt. water content.

GORE-TEX® expanded PTFE membrane is laminated to one side of the 0.25 inch (6.35 mm) polypropylene cell screen in a continuous fashion by using a heated roll that transfers heat through the ePTFE membrane, and melts the polypropylene surface in contact with the membrane and is then collected on a roll. This roll is then paid off with the screen side up, while the SODASORB® fines are spread into the screening cells with a spreader bar. A second layer of GORE-TEX® expanded PTFE membrane is then laminated to the 0.25 inch (6.35 mm) screening thus encapsulating the SODASORB® fines in between the screening cells. This composite is then slit to the proper width—in this case about 2.9 inches (74 mm). The separating screen is slit to the same width, and the composite and NALETEX polypropylene screen are rolled up together in a shape that resembles a 2.9 inch (74 mm) thick doughnut. The 0.25 inch (6.35 mm) polyester foam is wrapped around the outside and inside perimeter of the doughnut, and the assembly is placed into the canister. Gas flows in through the flat bottom of the canister, up and in between the adsorbent layers and out the top. The foam prevents expired gases from channeling along the inside or outside perimeter of the cartridge. The empty MK16 canister already had a suitable gas diffusion panel, which was intended to prevent granule migration on the inlet side. Thus the distribution of expired gases through the canister is controlled by the uniformity of the inlet diffusion panel as opposed to the haphazard gas channels created by adjacent granules in typical granular bed canisters.

EXAMPLE 2

A water tolerant carbon dioxide adsorbent material in this example is produced by way of thermally induced phase separation of ultra high molecular weight polyethylene. The equipment used is a Zsk28 twin screw extruder manufactured by Werner and Pfleiderer, along with an 8 inch (203 mm) flex lip sheeting die. Calcium hydroxide powder, with a mean particle size of 6 microns, is metered into the throat of the extruder using an accurate powder feeder at the rate or 2 ounces (56.7 g) per minute. Likewise, with a second smaller powder feeder, polyethylene with a molecular weight of 3 million is also fed into the extruder throat, but at a rate of only 0.04 ounces (1.13 g) per minute, which is the equivalent of 1% polyethylene. The powders are conveyed through the extruder and mixed with a mineral oil that is injected with a gear pump at the first extruder barrel at a rate of 2 ounces (56.7 g) per minute. With an extruder temperature setting of 175° C., the polyethylene dissolves in the process oil and becomes uniformly mixed with the calcium hydroxide and oil. The mixture is then extruded through the 8 inch (203 mm) sheeting die at a thickness of 0.05 inches, and subsequently fed through two (2) calendering rolls with a gap setting of 0.05 inches, and is then fed over chilled rolls to complete the cooling down to ambient temperatures. The process oil is then extracted out of the resulting sheet using hexane as a solvent. The roll of material is then placed in a container with a dry nitrogen purge, to evaporate the hexane.

The resulting roll has a tail that is then shaved slightly to a thickness of only 0.02 inches (0.5 mm). The material is then slit to the width of 6 inches, and is rolled up with a 0.030 inch (0.75 mm) thick separating screen manufactured by Nahle Plastics, on a 0.5 inch (12.7 mm) O.D. core. The tail is shaved to minimize channeling of gasses where the tail is attached to the core.

One full wrap of adsorbent is rolled up on the core before the separating screen is started so that adsorbent is always on both sides of the separating screen. The adsorbent and screen are rolled up to a diameter of 4.5 inches (114 mm). The screen is cut and the adsorbent makes one additional wrap such that the screen always has adsorbent on both sides. The adsorbent is cut, and then shaved to 0.02 inches (0.5 mm) thick on the end to minimize channeling near this cut edge.

A 5 inch (127 mm) diameter heavy gage shrink tube is placed over the roll, and is heated in an oven to shrink down onto the adsorbent roll. The ends are then cut to protrude ⅛ inch (3.2 mm) from the end of the adsorbent roll.

Figure 19:
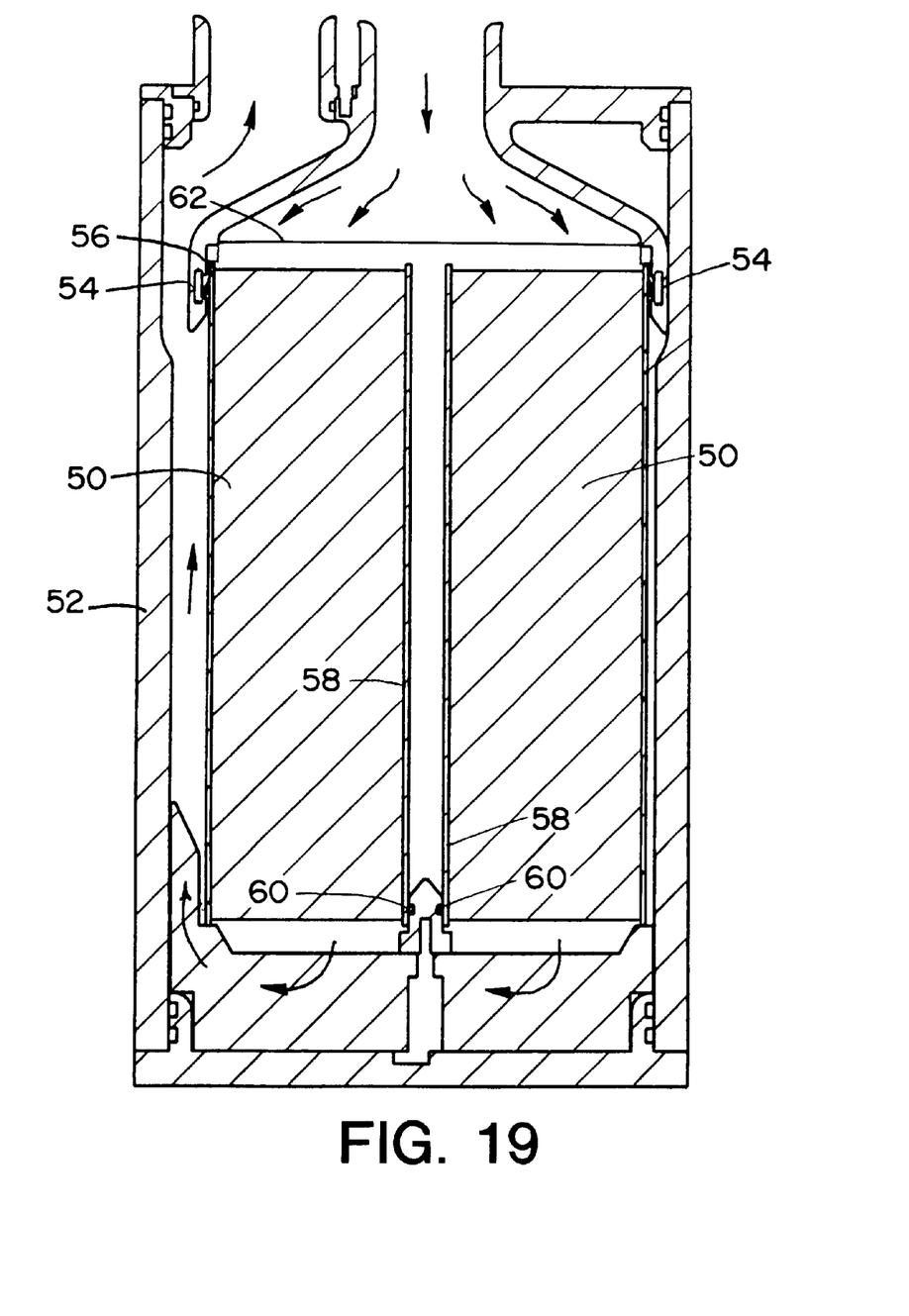
FIG. 19 is a cross section view of the adsorbent filter cartridge of the present invention placed inside a canister.

This cartridge is then inserted into the rebreather canister, and a silicon rubber seal contacts the outside diameter of the shrink tube and prevents gas from circumventing the $CO_2$ adsorbent cartridge as shown in FIG. 19.

Figure 20:
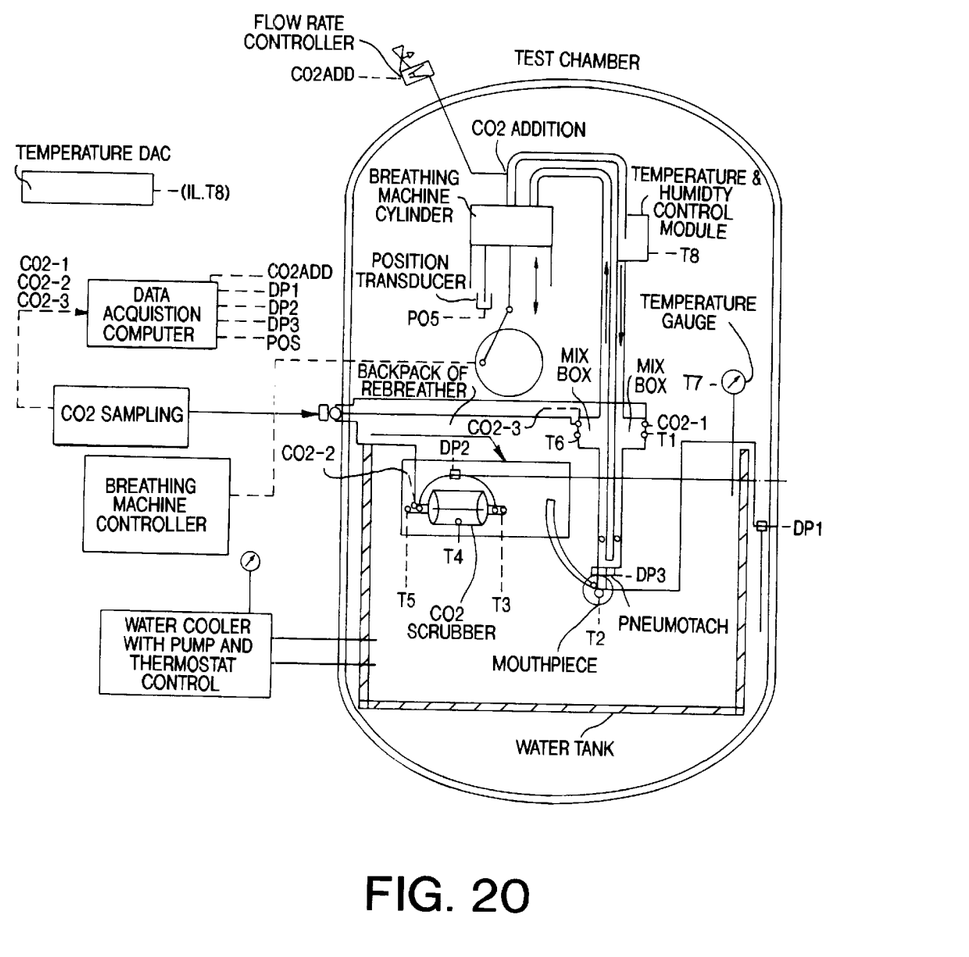
FIG. 20 is a diagram of an unmanned breathing simulator for use in testing the apparatus of the present invention.

The canister is then connected to a rebreather. To test the device of Example 2, the rebreather is connected to an unmanned breathing simulator, which can challenge the system with $CO_2$, simulating different metabolic work rates. The entire simulation rig is shown in FIG. 20 and is described below. The test apparatus comprises a mechanical breathing machine, which simulates the breathing volume and frequency that a human subject would produce, as well as simulating the temperature, relative humidity, and carbon dioxide content of the exhaled breath. The rebreather is placed in a large temperature controlled water container, and is connected to the breathing simulator by the mouthpiece. Gas is circulated through the rebreather, while $CO_2$ sensors measure the carbon dioxide content of the gas stream. After a period of time, $CO_2$ will begin to strike through the adsorbent canister, as the adsorbent is depleted. When the downstream concentration reaches 1% $CO_2$, the test is concluded, and the time to reach this 1% $CO_2$ concentration is recorded. The duration can then be divided by the canister's weight as a measure of the efficiency that the adsorbent has been utilized.

EXAMPLE 3

Figure 21:
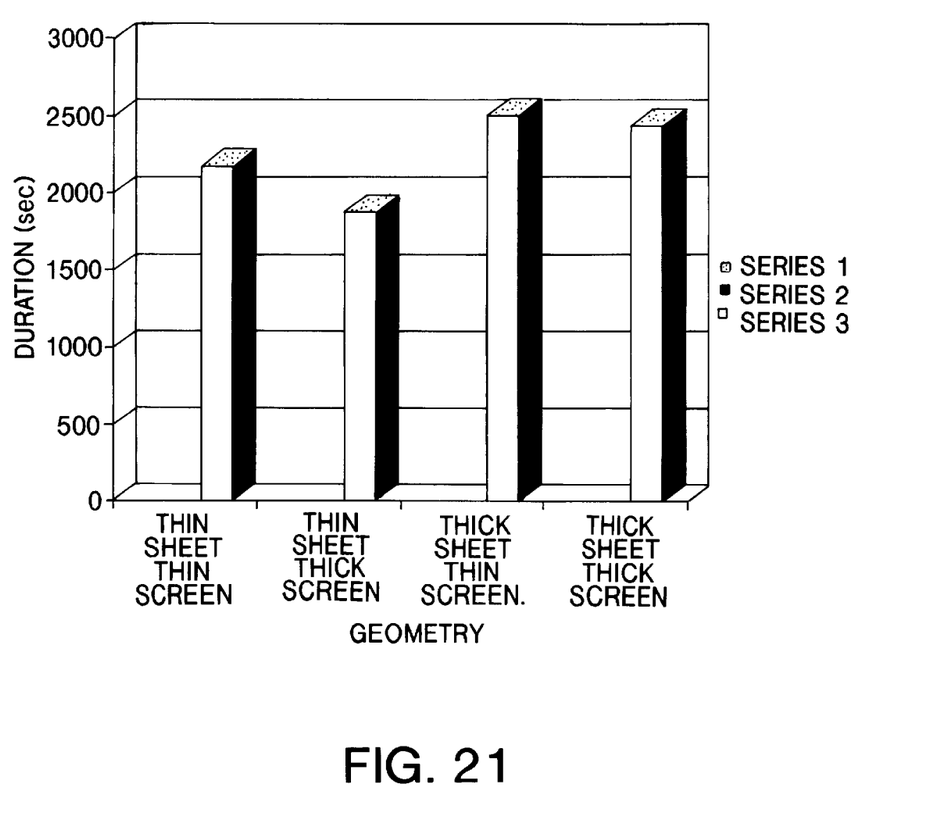
FIG. 21 is a graph plotting the time duration (in seconds) of effective performance of various embodiments of the present invention given variations in sheet thickness and screen thickness.

FIG. 21 illustrates the results of various configurations of the present invention as tested in the apparatus described in Example 2. The constructions tested were as follows:
- A. Thin Sheet/Thin Screen: Includes a 0.03 inch (0.75 mm) thick adsorbent sheet, and a 0.03 inch (0.75 mm) thick separating screen;
- B. Thin Sheet/Thick Screen: Includes a 0.03 inch (0.75 mm) thick adsorbent sheet, and a 0.05 inch (1.27 mm) thick separating screen;
- C. Thick Sheet/Thin Screen: Includes a 0.05 inch (1.27 mm) thick adsorbent sheet, and a 0.03 inch (0.75 mm) thick separating screen;
- D. Thick Sheet/Thick Screen: Include a 0.05 inch (1.27 mm) thick adsorbent sheet, and a 0.05 inch (1.27 mm) thick separating screen.

This screening experiment was designed to develop a basic understanding of how the four different combinations of sheet and screen thicknesses were going to perform with a water temperature 55° F., 1 atm pressure, and 40 L/min gas flow rate. In running the experiment in this manner, the focus was on sheet and screen effects. Each of the sheet and screen combinations was run three times to quantify the variability of the canisters' performance as well as to verify the data points. The run order for the twelve canisters was randomized. The total number of experimental runs performed was eighteen with each canister contributing an average of 3200 data points.

Upon review of the data in FIG. 21, one can see that the canister of the present invention did in fact remove $CO_2$ from the gas stream without any $CO_2$ strike through for a period of between 32 and 42 minutes. As such, it appears that having a reduced bulk surface area compared to granular systems does not seem to be a problem. In fact if one compares the "thick sheet/thick screen" duration to the "thin sheet/thin screen", one can see that the "thick sheet/thick screen" outperforms the thin combination. It should be noted that that the thick combination has the same weight of adsorbent as the thin combination, but only one half of the surface area, and yet still outperforms the thin combination. It is theorized that the thicker adsorbent sheet is able to maintain a higher temperature than the thin sheet, and as such is able to outperform a material with twice the bulk surface area. This is contrary to the conventional understanding that granular adsorbent systems are bulk diffusion flow limited at higher pressures or depths. Bulk diffusion flow limited systems have the overall constraint of the $CO_2$ not being able to diffuse out of the gas stream to the surface of the adsorbent. Instead, the present results suggest that granular systems are actually thermally constrained, and show reduced efficiencies at greater pressures because of the increased heat transfer caused by the denser gas, not because of slower diffusion in the denser gas. As such, test results not only point us in the right direction to improve the present invention, but also may disprove a long held view that granular systems are diffusion constrained at greater depths.

EXAMPLE 4

The same equipment and construction as in Example 2 is used except with three changes. The first change requires raising the polyethylene content from 1% to 1.5%, by increasing the feed rate from 0.04 ounces (1.13 g) per minute to 0.06 ounces (1.7 g) per minute. The second change involves one of the two calendering rolls that the extrudate is fed into after exiting the extrusion die. One of the smooth calendering rolls is replaced with a roll that has grooves machined from one end of the roll to the other and perpendicular to the extrudate direction. There are 144 grooves, 0.03 inches (0.75 mm) deep and 0.058 inches (1.5 mm) wide, every 2.5 degrees around the 8 inch (203 mm) diameter roll. The sides of the grooves also have a 10 degree draft to allow for easy release. The extrudate is fed between the two rolls with a gap setting of 0.04 inches, and the hot material flows into the grooves and is molded to the same shape of the grooved roll. The process oil is then extracted using hexane as a solvent and dry nitrogen to remove the hexane.

No separating screen is needed in this example, as the material is now self separating because of the molded separating ribs that are 0.03 inches (0.75 mm) high. The material is rolled up to a diameter of 4.5 inches. Finally, instead using shrink tube to hold the roll together, a piece of tape is wrapped around the perimeter of the roll at both ends. A 0.125 inch (3.17 mm) thick piece of open cell foam is placed underneath the tape, and over the tail of the roll. This prevents channeling of gases in this area. As is shown in FIG. 19, the roll or cartridge 50 is then slid into the canister 52, and a silicon rubber seal 54 seals against a taped area 56 of the roll 50. A passage 58 through the center of the core is sealed with an o-ring 60 inserted in the end of the core. A gas diffusion panel 62 is provided upstream of the cartridge 50.

The roll that is produced in this Example eliminates the need for a separating screen and also increases the capacity to adsorb $CO_2$. Additionally the use of plastic tape is less expensive and easier to manufacture.

Because of the increased polyethylene content, this material is now hydrophobic, and prevents particulate, as well as soluble caustic, from getting into the breathing loop of the rebreather. However, because of its hydrophobicity, simply spraying liquid water onto the surface of the sheet will not cause the water to be adsorbed into the adsorbent. Instead, a solution of 5% isopropyl alcohol and water is used. The alcohol and water solution wet the adsorbent and soak right in. Fifteen percent by weight of alcohol/water is the final content of the adsorbent.

Another solvent that may be used in the present invention is acetone. Acetone has a lower boiling point than alcohol and is easier to evaporate away, leaving water only in the adsorbent. Thus materials with higher contact angles (higher polymer content) may be produced, which would require higher solvent concentrations to wet the adsorbent, while still being able to be subsequently removed through drying, without removing the water.

EXAMPLE 5

A preferred embodiment of the present invention utilizes the same technique and equipment described in Example 2, with several changes. First, the adsorbent is made at a thickness of 0.025 inches (0.635 mm) instead of 0.05 (1.27 mm). An expanded PTFE membrane is then laminated to one side of the adsorbent. The adsorbent is then sprayed with water on the non membrane side, to reach the desired moisture content.

Two rolls of material produced in this way are then rolled up together, with the adsorbent sides facing each other, and the membrane side facing out. This technique allows the adsorbent to be moisturized without the use of a solvent. The two layers combine to make the same 0.05 inch (1.27 mm) thick adsorbent as in example two, and is rolled up with a separating screen to form the adsorbent cartridge. The ends of the adsorbent cartridge which are not protected by the expanded PTFE membranes are then coated with an epoxy which seals the caustic. Thus all sides of the adsorbent sheet are sealed from liquid exposure.

A cartridge produced in this manner has the most durably water resistant characteristics, while having the advantage of eliminating a solvent in the moisturization process, which reduces manufacturing costs.

While particular embodiments of the present invention have been illustrated and described herein, the present invention should not be limited to such illustrations and descriptions. It should be apparent that changes and modifications may be incorporated and embodied as part of the present invention within the scope of the following claims.

What is claimed is:

1. A gas adsorbent system for use in a self-contained breathing apparatus that comprises
   a canister body;
   a gas adsorbent material formed into an air permeable and liquid-water resistant sheet that prevents migration of gas adsorbent material from the canister body in the event that water passes through the canister body;
   wherein the sheet is mounted in the canister body so as to allow air flow through the canister body to interact with the gas adsorbent material within the sheet.

2. The rebreather system of claim 1 wherein the gas adsorbent material and sheet are pre-formed into a cartridge for readily installation into the canister body.

3. The rebreather system of claim 1 wherein the sheet is arranged in multiple layers and an air-flow gap is provided between the layers.

4. The rebreather system of claim 3 wherein the air-flow gap is provided by a screen mounted between the layers of the sheet.

5. The rebreather system of claim 1 wherein gas adsorbent material is embedded within the sheet.

6. The rebreather system of claim 1 wherein the gas adsorbent material and sheet are rolled into a cartridge.

7. The rebreather system of claim 6 wherein the cartridge is surrounded by a shrink wrap.

8. The rebreather system of claim 1 wherein the sheet comprises a filled-polymer sealed within a microporous membrane.

9. The rebreather system of claim 8 wherein the microporous membrane comprises expanded polytetrafluoroethylene.

10. The rebreather system of claim 1 wherein the sheet comprises polyethylene.

11. The rebreather system of claim 10 wherein the polyethylene content comprises between 0.6 and 4% by weight.

12. The rebreather system of claim 1 wherein the adsorbent material is selected from the group consisting of calcium hydroxide, sodium hydroxide, potassium hydroxide, lithium hydroxide (LiOH) and mixtures thereof.

13. The rebreather system of claim 1 wherein the system includes a diffusion panel.

14. The rebreather system of claim 1 wherein the sheet is arranged in multiple layers; and
at least one separating element provided between the layers.

15. The rebreather system of claim 14 wherein the separating element has a width to height ratio of greater than 2:1.

16. The rebreather system of claim 14 wherein the separating element contains adsorbent therein.

17. The rebreather system of claim 1 wherein the adsorbent material is selected from the group consisting of calcium hydroxide, sodium hydroxide, potassium hydroxide, lithium hydroxide (LiOH) and mixtures thereof.

18. The rebreather system of claim 1 wherein the adsorbent comprises one selected from the group consisting of Group IA and IIA metal hydroxides.

19. The rebreather system of claim 1 wherein the adsorbent comprises calcium hydroxide.

20. The rebreather system of claim 1 wherein the adsorbent comprises lithium hydroxide.

21. A gas adsorbent rebreather system employing a canister body for holding gas adsorbent material that comprises
a carbon dioxide gas adsorbent material formed into a sheet that prevents releasing carbon dioxide gas adsorbent particles;
the sheet being pre-formed into a cartridge for ready installation into the canister body;
wherein the sheet is arranged in multiple layers and at least one air-flow gap is provided between the layers; and
wherein the cartridge is proportioned to orient the sheet within the canister body so as to direct air flow through at least one air-flow gap to interact with the gas adsorbent material in the sheet.

22. The rebreather system of claim 21 wherein the sheet prevents migration of gas adsorbent material from the canister body in the even that water passes through the canister body.

23. The rebreather system of claim 17 wherein the air-flow gap is provided by a screen mounted between the layers of the sheet.

24. The rebreather system of claim 21 wherein gas adsorbent material is embedded within the sheet.

25. The rebreather system of claim 21 wherein the gas adsorbent material and sheet are rolled into a cartridge.

26. The rebreather system of claim 25 wherein the sheet has a tapered tail on at least one end.

27. The rebreather system of claim 25 wherein the cartridge is surrounded by a shrink wrap.

28. The rebreather system of claim 21 wherein the sheet comprises a polyethylene.

29. The rebreather system of claim 28 wherein the polyethylene content comprises between 0.6 and 4% by weight.

30. The rebreather system of claim 21 wherein the gas adsorbent material is sealed within a microporous membrane.

31. The rebreather system of claim 30 wherein the microporous membrane comprises expanded polytetrafluoroethylene.

32. The rebreather system of claim 21 wherein the system includes a diffusion panel.

33. The rebreather system of claim 21 wherein the sheet is arranged in multiple layers; and
at least one separating element provided between the layers.

34. The rebreather system of claim 21 wherein the separating element has a width to height ratio of greater than 2:1.

35. The rebreather system of claim 33 wherein the separating element contains adsorbent therein.

36. The rebreather system of claim 21 wherein the multiple air-flow gaps are provided by forming separating elements out of the sheet.

37. The rebreather system of claim 21 wherein the sheet is air permeable and liquid-water resistant such that migration of carbon dioxide adsorbent material from the cartridge is prevented in the event that water passes through the cartridge.

38. The rebreather system of claim 21 wherein the carbon dioxide adsorbent comprises one selected from the group consisting of Group IA and IIA metal hydroxides.

39. The rebreather system of claim 21 wherein the carbon dioxide adsorbent comprises calcium hydroxide.

40. The rebreather system of claim 21 wherein the carbon dioxide adsorbent comprises lithium hydroxide.

41. A rebreather system comprising
a carbon dioxide adsorbent formed into a sheet;
the sheet being arranged as a cartridge in multiple layers having multiple air-flow gaps provided between the layers;
the cartridge being adapted for installation in the rebreather system so as to direct air flow through the air flow gaps essentially parallel to the sheet layers, interacting the carbon dioxide adsorbent material with the air; and
a diffusion panel that is proportioned to redistribute gases flowing through the cartridge.

42. The rebreather system of claim 41 wherein the carbon dioxide adsorbent is embedded within the sheet.

43. The rebreather system of claim 41 wherein the multiple air-flow gaps are provided by a screen positioned between the layers.

44. The rebreather system of claim 41 wherein the multiple air-flow gaps are provided by forming separating elements out of the sheet.

45. The rebreather system of claim 41 wherein the sheet is air permeable and liquid-water resistant such that migration of carbon dioxide adsorbent material from the cartridge is prevented in the event that water passes through the cartridge.

46. The rebreather system of claim 41 wherein the sheet comprises polyethylene.

47. The rebreather system of claim 46 wherein the polyethylene content comprises between 0.6 and 4% by weight.

48. The rebreather system of claim 41 wherein the carbon dioxide adsorbent material is selected from the group consisting of calcium hydroxide, sodium hydroxide, potassium hydroxide, lithium hydroxide (LiOH) and mixtures thereof.

49. The rebreather system of claim 41 wherein the carbon dioxide adsorbent comprises one selected from the group consisting of Group IA and IIA metal hydroxides.

50. The rebreather system of claim 41 wherein the carbon dioxide adsorbent comprises calcium hydroxide.

51. The rebreather system of claim 41 wherein the carbon dioxide adsorbent comprises lithium hydroxide.

* * * * *